May 12, 1936. L. W. HANCE 2,040,808
BULL RING WITH SECTIONAL PACKING RINGS
Filed Nov. 23, 1933 2 Sheets-Sheet 1
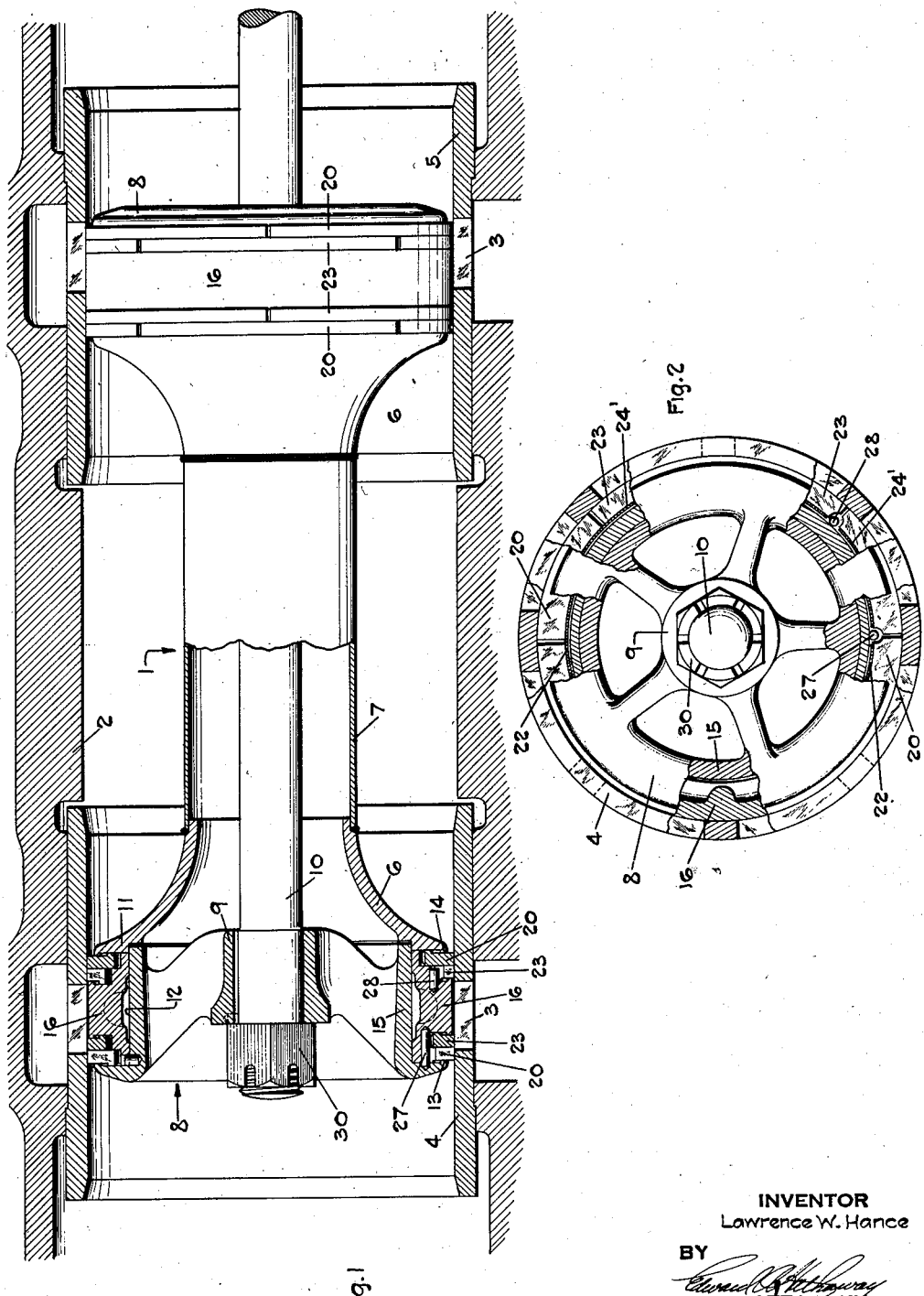
INVENTOR
Lawrence W. Hance
BY
ATTORNEY May 12, 1936. L. W. HANCE 2,040,808
BULL RING WITH SECTIONAL PACKING RINGS
Filed Nov. 23, 1933 2 Sheets-Sheet 2
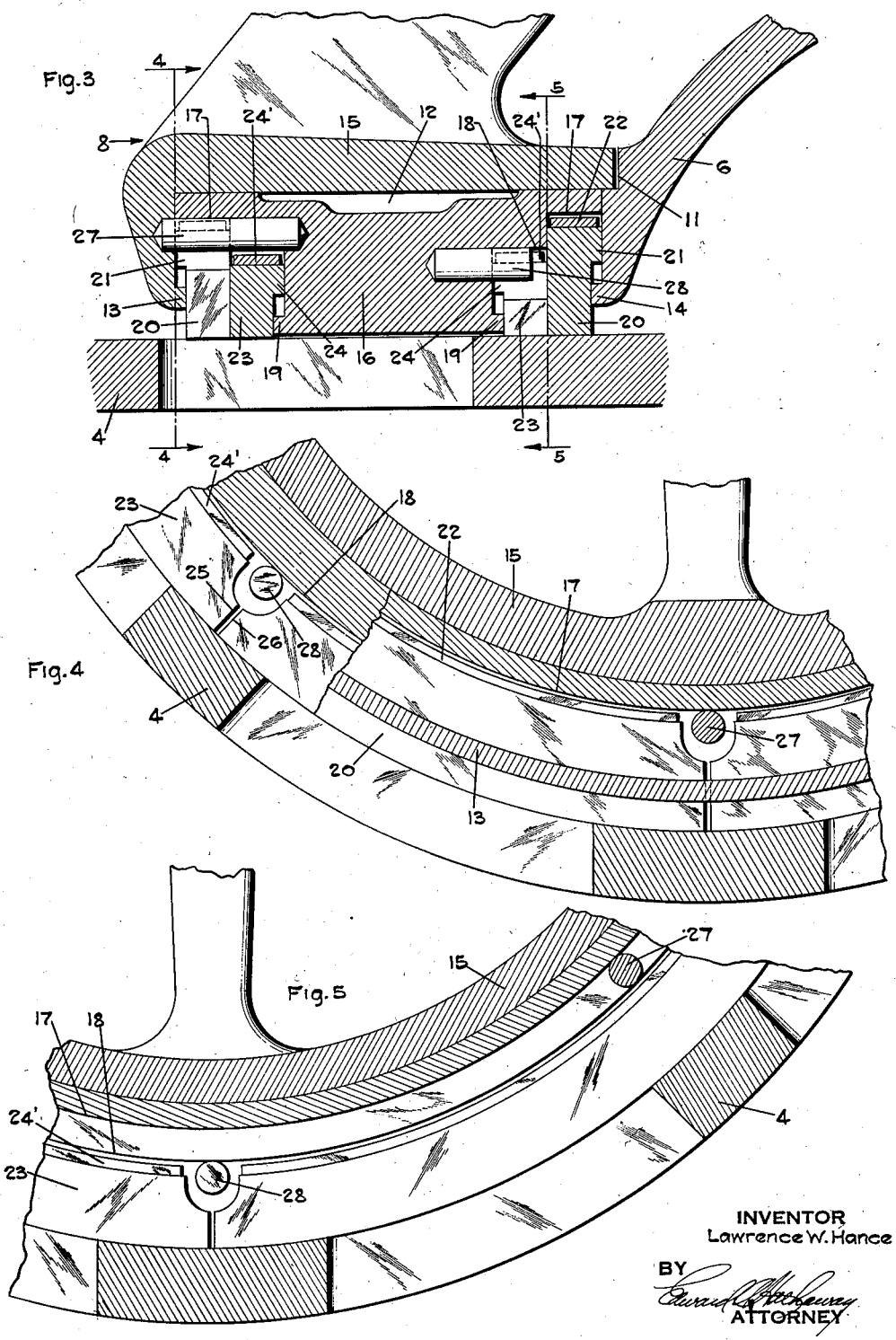

Patented May 12, 1936

2,040,808

UNITED STATES PATENT OFFICE 2,040,808

BULL RING WITH SECTIONAL PACKING RINGS

Lawrence W. Hance, Philadelphia, Pa.

Application November 23, 1933, Serial No. 699,422

4 Claims. (Cl. 309—29)

This invention relates generally to piston rings and more particularly to an improved combination of a bull ring and sectional packing rings especially adapted for piston valves.

With steam locomotives or engines it is desirable to have efficient and economical bull rings and piston packing whether the same is for an engine piston or a valve piston, although in connection with piston valves it is further desirable that the packing rings should effectively cooperate with the inlet and exhaust ports so as to insure accurate occurrence of the admission, cut-off and exhaust in so far as the valve is concerned. While various attempts have heretofore been made to provide efficient rings and arrangements thereof, yet they have been deficient either from a manufacturing, maintenance or operation standpoint.

It is one object of my invention to provide an improved combination of a bull ring and sectional packing rings. Another object is to provide an improved combination between a piston, bull ring and sectional sealing rings whereby the rings may be easily and effectively longitudinally assembled with the piston and at the same time will properly hold the sectional rings completely in position even though a sectional ring may by chance have a small portion break.

In one specific aspect of the invention I accomplish the foregoing objects by providing improved means whereby a piston body and a removable follower casting form an annular ring groove with opposed peripheral flanges or lips while a bull ring seated in said groove has secondary grooves to receive sectional sealing rings, these sectional rings being provided with flanges adapted for cooperation with said groove flanges. In a further specific aspect of the invention, springs are interposed between the sealing rings and bull ring and a plurality of rows of sealing rings are disposed in individual offset grooves formed in the bull ring, the piston being provided with a removable follower member, whereby dowel pins extending longitudinally of the piston axis may be effectively employed to maintain a staggered relation between the ends of the sectional rings in adjacent grooves.

Other objects and advantages will be more apparent to those skilled in the art from the following description of the accompanying drawings in which:

Fig. 1 is a longitudinal view of a piston valve embodying my invention, partially broken away to show details of construction;

Fig. 2 is an end view of the piston valve partially broken away to show details of construction;

Fig. 3 is an enlarged sectional view of one portion of a piston valve and its follower member and showing the bull ring and sectional rings in cooperation therewith;

Figs. 4 and 5 are transverse sectional views taken substantially on the lines 4—4 and 5—5 of Fig. 3.

In the particular embodiment of the invention such as is disclosed herein merely for the purpose of illustrating one specific form among possible others that the invention might take, I have shown the invention in connection with a piston valve generally indicated at 1. This operates within a suitable valve chest 2 having ports 3 in suitable liners 4 and 5. It will of course be understood that my invention is applicable to pistons for engine cylinders, although due to the nicety with which it is desirable to maintain proper operation of the admission, cut-off and exhaust of the steam, my invention is particularly applicable to piston valves.

The valve may be of any suitable construction including two cast or otherwise suitably formed bodies 6 connected by a spacer 7 while a removable follower member usually in the form of a casting 8 has a central boss 9 through which a piston or valve rod 10 extends for holding the follower members 8 in fixed relation to the valve bodies 6. Inasmuch as the valve and ring construction are the same at each end of the piston, it will suffice to describe only one end.

With the follower member 8 properly seated in a circular recess 11 of the valve body, a ring groove 12 is thereby provided. As shown more clearly in Fig. 3, opposed peripheral flanges 13 and 14 are provided respectively on the follower member 8 and valve body 6. Disposed within ring groove 12 and normally seated on the bottom thereof so as to be carried directly on the annular portion 15 of the follower member 8 is preferably a one-piece, non-expansible bull ring 16. This ring preferably has at each side thereof a pair of offset annular grooves or end recesses 17 and 18, it being noted particularly from the right side of Fig. 3 that the inner groove 18 is outwardly offset from groove 17. Adjacent to grooves 18 are peripheral flanges or bull ring lips 19. These lips are of a sufficiently greater radial distance than lips 13 and 14 so as to compensate for the offset bottoms of grooves 17 and 18, thereby permitting the effective depth of each groove to be substantially the same. As a result of this arrangement the sectional rings to be described have substantially the same cross-section at their base.

The sectional packing or sealing rings comprise a series of outer segments 20 having an offset lower flanged portion 21 in radial alignment with groove flanges 13 and 14. The base of these segments is slidably supported by the opposite sides of the ring groove 17 which are formed by the end face of valve body 6 and one of the offset faces of the bull ring 16. The segments 20 are spaced from the bottom of groove 17 to permit a preferably flat circular spring 22 to urge the segments outwardly. An adjacent series of inner segments 23 are disposed in groove 18 and also are provided with an offset flange 24 in radial alignment with the bull ring flanges 19. These rings are also slightly spaced from the bottom of groove 18 to permit a preferably flat circular spring 24' to urge the segments outwardly. This construction and arrangement of sealing rings is duplicated at each end of the bull ring.

As shown in Fig. 4, the adjacent ends 25 and 26 of one series of segments are maintained in staggered relation to similar ring ends of the next series of sealing rings. This is accomplished by the provision of longitudinal dowel pins 27 and 28. As shown in Fig. 3, pin 27 is seated in suitable recesses of both the bull ring 16 and follower member 8 to maintain one of the outer sealing rings 20 in position while pin 28 is seated only in bull ring 16 but to a greater depth than pin 27 to hold the inner sealing rings 23 in position. While Fig. 3 shows a dowel pin 27 for only one of the sealing rings 20, yet it will be understood that for the other ring 20 a similar dowel pin is carried by the bull ring and body 6. Also for the other ring 23, a dowel pin is provided similar to 28.

As a result of my improved arrangement it is seen that by removing the piston rod nut 30, follower member 8 may be axially removed together with the bull and sealing rings, and these may be axially removed from the follower due to the longitudinal dowel pins 27 and 28. Hence it is seen that from this arrangement the full yieldable action of the sealing rings is maintained while at the same time the bull ring is adapted to be of large cross-sectional area supported at widely spaced points in groove 12, thereby insuring maximum stability and rigidity of the bull ring and yet permit complete flexibility of the sealing rings. These results are accomplished while at the same time maintaining a relatively simple assembly arrangement of the elements together with complete assurance that the sectional or segmental sealing rings will be retained in their grooves by the continuous flanges such as 13, 14 and 19.

I claim:

1. The combination comprising a piston having a body carrying a removable follower to form a ring groove, said body and follower having opposed peripheral flanges, a bullring seated in said groove and having end recesses and flanges respectively overlying a portion of the recesses, and a pair of segmental sealing rings disposed in one of said recesses and another pair of sealing rings disposed in the other recess, the adjacent radial surfaces of one pair of said sealing rings mutually slidably engaging each other and similarly for the adjacent radial surfaces of the other pair of sealing rings, the outer radial surfaces of each pair of sealing rings being provided with flanges certain of which are disposed in radial alignment with the peripheral flanges of said body and the others of which are disposed in radial alignment with the peripheral flanges of said follower.

2. The combination set forth in claim 1 further characterized in that said end recesses have offset bottom surfaces, and one ring of each pair of sealing rings disposed in said recesses is of less radial depth than the other sealing rings of said pairs thereof.

3. The combination set forth in claim 1 further characterized in that said end recesses have offset bottom surfaces and one ring of each pair of sealing rings is of less radial depth than the other ring of the pairs of sealing rings, and longitudinally extending dowel pins for each of said sealing rings, the dowel pins for the rings of greater depth extending inside the inner circumference of the rings of smaller radial depth.

4. The combination comprising a piston having a body carrying a removable follower to form a ring groove, said body and follower having opposed peripheral flanges, a bull ring seated in said groove and having end recesses and flanges respectively overlying a portion of said recesses in radially offset relation to said peripheral flanges, and segmental sealing means disposed in said recesses and having oppositely directed flanges radially offset from each other and disposed for radial cooperation with said peripheral flanges and said bull ring flanges.

LAWRENCE W. HANCE.